United States Patent
Ho

(10) Patent No.: US 12,499,433 B1
(45) Date of Patent: *Dec. 16, 2025

(54) SYSTEMS AND METHODS FOR CONTACTLESS SMART CARD AUTHENTICATION

(71) Applicant: Wells Fargo Bank, N.A., San Francisco, CA (US)

(72) Inventor: Peter Ho, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,548

(22) Filed: Oct. 4, 2021

Related U.S. Application Data

(63) Continuation of application No. 16/291,917, filed on Mar. 4, 2019, now Pat. No. 11,138,593, which is a
(Continued)

(51) Int. Cl.
*G06Q 20/34* (2012.01)
*G06Q 20/36* (2012.01)
*G06Q 20/38* (2012.01)

(52) U.S. Cl.
CPC ....... *G06Q 20/354* (2013.01); *G06Q 20/3674* (2013.01); *G06Q 20/382* (2013.01)

(58) Field of Classification Search
CPC . G06Q 20/3674; G06Q 20/382; G06Q 20/354
See application file for complete search history.

(56) References Cited

U.S. PATENT DOCUMENTS 6,324,524 B1 11/2001 Lent et al.
6,575,361 B1 * 6/2003 Graves ................. G06Q 20/085
235/379

(Continued)

FOREIGN PATENT DOCUMENTS

AU 2018101214 A4 9/2018
CN 105357190 A 2/2016
(Continued)

OTHER PUBLICATIONS

Java Tutorials, "What Is a Network Interface?," http://docs.oracle.com, all pages. (Year: 2012).
(Continued)

*Primary Examiner* — Steven S Kim
(74) *Attorney, Agent, or Firm* — Foley & Lardner LLP

(57) ABSTRACT

Systems, methods, and computer-readable storage media of activating a card having a contactless chip are provided. One method includes receiving, from a mobile device via a wireless transmission from the card having the contactless chip to the mobile device, a cryptogram, and decrypting the cryptogram to reveal information. The method further includes comparing the revealed information regarding at least one of the card or the user to information in a customer database, confirming the revealed information, and updating the customer database to indicate that the revealed information regarding the at least one of the card or the user is confirmed. The method further includes activating the card for an initial card transaction based on updating the customer database, and providing, to the mobile device, a payment card token associated with the card as part of a mobile wallet transaction using the mobile device involving the card.

8 Claims, 3 Drawing Sheets

Related U.S. Application Data continuation of application No. 15/081,500, filed on Mar. 25, 2016, now Pat. No. 11,188,919.

(60) Provisional application No. 62/139,411, filed on Mar. 27, 2015.

(56) References Cited

U.S. PATENT DOCUMENTS

| | | | |
|---|---|---|---|
| 7,013,393 B1 * | 3/2006 | Stevens | H04M 1/675 379/357.03 |
| 7,121,456 B2 | 10/2006 | Spaeth et al. | |
| 7,146,159 B1 * | 12/2006 | Zhu | G06Q 40/03 235/382 |
| 7,818,264 B2 | 10/2010 | Hammad | |
| 8,205,249 B2 | 6/2012 | Meister et al. | |
| 8,245,292 B2 * | 8/2012 | Buer | G06F 21/34 713/172 |
| 8,313,022 B2 | 11/2012 | Hammad et al. | |
| 8,332,325 B2 | 12/2012 | Faith et al. | |
| 8,352,323 B2 | 1/2013 | Fisher | |
| 8,355,982 B2 | 1/2013 | Hazel et al. | |
| 8,380,177 B2 | 2/2013 | Laracey | |
| 8,430,325 B2 | 4/2013 | Jain | |
| 8,452,707 B2 | 5/2013 | Sharma | |
| 8,511,547 B2 | 8/2013 | Rans et al. | |
| 8,635,157 B2 | 1/2014 | Smith et al. | |
| 8,639,629 B1 | 1/2014 | Hoffman | |
| 8,763,896 B2 | 7/2014 | Kushevsky et al. | |
| 8,856,045 B1 | 10/2014 | Patel et al. | |
| 8,910,055 B2 | 12/2014 | Berger | |
| 8,918,855 B2 | 12/2014 | Singh et al. | |
| 8,977,569 B2 | 3/2015 | Rao | |
| 9,135,619 B1 | 9/2015 | Simakov et al. | |
| 9,183,480 B1 | 11/2015 | Quigley et al. | |
| 9,195,984 B1 | 11/2015 | Spector et al. | |
| 9,208,634 B2 * | 12/2015 | Lam | G07F 7/1008 |
| 9,218,624 B2 * | 12/2015 | Moghadam | G06Q 20/326 |
| 9,256,873 B2 | 2/2016 | Patel et al. | |
| 9,317,848 B2 | 4/2016 | Hammad | |
| 9,367,845 B2 | 6/2016 | Candelore et al. | |
| 9,374,373 B1 | 6/2016 | Chan et al. | |
| 9,542,673 B2 | 1/2017 | Tanner et al. | |
| 9,547,857 B2 | 1/2017 | Moghadam | |
| 9,547,859 B2 | 1/2017 | Patel et al. | |
| 9,576,285 B2 | 2/2017 | Zhou | |
| 9,619,794 B2 | 4/2017 | Zhou et al. | |
| 9,652,770 B1 | 5/2017 | Kurani et al. | |
| 9,741,036 B1 | 8/2017 | Grassadonia et al. | |
| 9,785,943 B2 | 10/2017 | Phillips et al. | |
| 9,805,370 B1 | 10/2017 | Quigley et al. | |
| 9,813,236 B2 | 11/2017 | Buer | |
| 9,830,328 B2 | 11/2017 | Faith et al. | |
| 9,830,589 B2 | 11/2017 | Xing | |
| 9,846,863 B2 | 12/2017 | Grossi et al. | |
| 9,852,426 B2 | 12/2017 | Bacastow | |
| 9,928,493 B2 | 3/2018 | Parker et al. | |
| 9,947,183 B2 | 4/2018 | Priebatsch | |
| 10,049,352 B2 | 8/2018 | Klingen et al. | |
| 10,074,231 B2 | 9/2018 | Miranda et al. | |
| 10,089,624 B2 | 10/2018 | Hammad et al. | |
| 10,102,364 B2 | 10/2018 | George | |
| 10,162,956 B1 | 12/2018 | Truong et al. | |
| 10,198,725 B2 | 2/2019 | Royyuru et al. | |
| 10,198,728 B2 | 2/2019 | Huxham et al. | |
| 10,262,320 B2 | 4/2019 | Moghadam | |
| 10,373,138 B2 | 8/2019 | Hammad | |
| 10,395,244 B1 | 8/2019 | Mossler et al. | |
| 10,438,210 B1 | 10/2019 | Perezleon et al. | |
| 10,462,128 B2 | 10/2019 | George | |
| 10,467,622 B1 | 11/2019 | Rule et al. | |
| 10,484,366 B2 | 11/2019 | George | |
| 10,489,781 B1 | 11/2019 | Osborn | |
| 10,510,074 B1 | 12/2019 | Rule et al. | |
| 10,541,995 B1 | 1/2020 | Mossler et al. | |
| 10,586,224 B2 | 3/2020 | Tanner et al. | |
| 10,607,214 B1 | 3/2020 | Rule et al. | |
| 10,607,216 B1 | 3/2020 | Ilincic et al. | |
| 10,636,241 B1 | 4/2020 | Rule et al. | |
| 10,643,420 B1 | 5/2020 | Rule et al. | |
| 10,685,349 B2 | 6/2020 | Brickell et al. | |
| 10,719,833 B2 | 7/2020 | Patel et al. | |
| 10,733,283 B1 | 8/2020 | Osborn et al. | |
| 10,740,444 B2 | 8/2020 | Cho et al. | |
| 10,769,299 B2 | 9/2020 | Rule et al. | |
| 10,803,463 B1 | 10/2020 | Barnum et al. | |
| 10,825,018 B2 | 11/2020 | Moghadam | |
| 10,957,143 B2 | 3/2021 | Rule et al. | |
| 11,004,074 B1 | 5/2021 | Hiccox et al. | |
| 11,037,139 B1 * | 6/2021 | Ho | G06Q 20/3263 |
| 11,062,302 B1 | 7/2021 | Ho et al. | |
| 11,100,431 B2 | 8/2021 | Mullen et al. | |
| 11,138,593 B1 * | 10/2021 | Ho | G06Q 20/382 |
| 11,138,605 B2 | 10/2021 | Aabye et al. | |
| 11,200,563 B2 | 12/2021 | Cody et al. | |
| 11,210,656 B2 | 12/2021 | Rule et al. | |
| 11,301,848 B2 | 4/2022 | Ilincic et al. | |
| 11,301,857 B1 | 4/2022 | Adam | |
| 11,334,872 B2 | 5/2022 | Phillips et al. | |
| 11,348,150 B2 | 5/2022 | Singhal et al. | |
| 11,372,954 B2 * | 6/2022 | Wiesman | G06Q 40/00 |
| 11,373,169 B2 | 6/2022 | Rule et al. | |
| 11,373,186 B2 | 6/2022 | Sharma et al. | |
| 11,392,933 B2 | 7/2022 | Mossler et al. | |
| 11,416,861 B1 | 8/2022 | Hubley | |
| 11,423,392 B1 | 8/2022 | Ho et al. | |
| 11,436,887 B2 | 9/2022 | Rule et al. | |
| 11,455,626 B2 | 9/2022 | Rule et al. | |
| 11,501,581 B2 | 11/2022 | Hammad et al. | |
| 11,521,213 B2 | 12/2022 | Rule et al. | |
| 11,562,358 B2 | 1/2023 | Rule et al. | |
| 11,615,395 B2 | 3/2023 | Mchugh et al. | |
| 11,625,708 B2 | 4/2023 | Kang | |
| 11,645,646 B2 | 5/2023 | Rule et al. | |
| 11,734,985 B2 | 8/2023 | Rule et al. | |
| 11,875,338 B2 | 1/2024 | Rule et al. | |
| 11,880,823 B2 | 1/2024 | Rule et al. | |
| 11,922,417 B2 | 3/2024 | Rule et al. | |
| 11,961,089 B2 | 4/2024 | Rule et al. | |
| 11,989,731 B2 | 5/2024 | Sharma et al. | |
| 12,056,692 B2 | 8/2024 | Ilincic et al. | |
| 12,061,682 B2 | 8/2024 | Bowers et al. | |
| 12,067,568 B2 | 8/2024 | Osborn et al. | |
| 12,105,789 B2 | 10/2024 | Sharma et al. | |
| 12,112,310 B2 | 10/2024 | Mchugh et al. | |
| 12,112,325 B2 | 10/2024 | Aabye et al. | |
| 12,159,275 B1 * | 12/2024 | Ho | G06Q 20/40975 |
| 2002/0002466 A1 | 1/2002 | Kambayashi et al. | |
| 2002/0023051 A1 | 2/2002 | Kunzle et al. | |
| 2002/0116333 A1 | 8/2002 | McDonnell et al. | |
| 2002/0117541 A1 * | 8/2002 | Biggar | G06Q 30/04 235/379 |
| 2003/0051173 A1 | 3/2003 | Krueger | |
| 2003/0061154 A1 | 3/2003 | Chacko | |
| 2003/0112120 A1 | 6/2003 | K. | |
| 2004/0006497 A1 | 1/2004 | Nestor et al. | |
| 2004/0120404 A1 | 6/2004 | Sugahara et al. | |
| 2005/0156026 A1 | 7/2005 | Ghosh et al. | |
| 2005/0234860 A1 | 10/2005 | Roever et al. | |
| 2005/0246193 A1 | 11/2005 | Roever et al. | |
| 2005/0269402 A1 | 12/2005 | Spitzer et al. | |
| 2006/0035707 A1 | 2/2006 | Nguyen et al. | |
| 2007/0088611 A1 | 4/2007 | Christiansen | |
| 2007/0187491 A1 | 8/2007 | Godwin et al. | |
| 2008/0010215 A1 | 1/2008 | Rackley, III et al. | |
| 2008/0035725 A1 | 2/2008 | Jambunathan et al. | |
| 2008/0040276 A1 | 2/2008 | Hammad et al. | |
| 2008/0123828 A1 * | 5/2008 | Mayer | H04M 17/00 379/114.2 |
| 2008/0178258 A1 * | 7/2008 | Loomis | G06Q 20/401 726/2 |
| 2008/0212771 A1 * | 9/2008 | Hauser | H04L 9/3234 726/6 |
| 2008/0242274 A1 | 10/2008 | Swanburg et al. | |

(56) References Cited

U.S. PATENT DOCUMENTS

| | | |
|---|---|---|
| 2009/0055648 A1 | 2/2009 | Kim et al. |
| 2009/0143104 A1 | 6/2009 | Loh et al. |
| 2009/0156238 A1 | 6/2009 | Smith |
| 2009/0200371 A1 | 8/2009 | Kean et al. |
| 2010/0049654 A1 | 2/2010 | Pilo |
| 2010/0088237 A1 | 4/2010 | Wankmueller |
| 2010/0125509 A1 | 5/2010 | Kranzley et al. |
| 2010/0161470 A1 | 6/2010 | Wiesman et al. |
| 2010/0198728 A1 | 8/2010 | Aabye et al. |
| 2010/0276484 A1 | 11/2010 | Banerjee et al. |
| 2010/0293382 A1 | 11/2010 | Hammad |
| 2010/0306072 A1 | 12/2010 | Ford et al. |
| 2010/0312703 A1 | 12/2010 | Kulpati et al. |
| 2011/0057031 A1 | 3/2011 | Persaud et al. |
| 2011/0112968 A1 | 5/2011 | Florek et al. |
| 2011/0131108 A1 | 6/2011 | Doxey |
| 2011/0208658 A1 | 8/2011 | Makhotin |
| 2011/0225094 A1 | 9/2011 | Hammad |
| 2011/0270755 A1 | 11/2011 | Pinski |
| 2011/0276487 A1 | 11/2011 | Hammad |
| 2011/0282946 A1 | 11/2011 | Keohane et al. |
| 2011/0302646 A1 | 12/2011 | Ronda et al. |
| 2011/0314095 A1 | 12/2011 | Gupta et al. |
| 2012/0018506 A1 | 1/2012 | Hammad et al. |
| 2012/0039469 A1 | 2/2012 | Mueller |
| 2012/0078735 A1 | 3/2012 | Bauer et al. |
| 2012/0095852 A1 | 4/2012 | Bauer et al. |
| 2012/0123937 A1 | 5/2012 | Spodak |
| 2012/0136786 A1 | 5/2012 | Romagnoli et al. |
| 2012/0136796 A1 | 5/2012 | Hammad et al. |
| 2012/0149331 A1 | 6/2012 | Wu et al. |
| 2012/0209749 A1 | 8/2012 | Hammad et al. |
| 2012/0290449 A1 | 11/2012 | Mullen et al. |
| 2012/0290472 A1 | 11/2012 | Mullen et al. |
| 2012/0317025 A1 | 12/2012 | Wong |
| 2012/0323717 A1 | 12/2012 | Kirsch |
| 2013/0013480 A1* | 1/2013 | Venter ............... G06Q 20/3221 |
| | | 705/35 |
| 2013/0054412 A1 | 2/2013 | Brendell et al. |
| 2013/0054417 A1 | 2/2013 | O'Donoghue et al. |
| 2013/0054474 A1 | 2/2013 | Yeager |
| 2013/0092741 A1 | 4/2013 | Loh et al. |
| 2013/0117138 A1 | 5/2013 | Hazel et al. |
| 2013/0124346 A1 | 5/2013 | Baldwin et al. |
| 2013/0152185 A1 | 6/2013 | Singh et al. |
| 2013/0159178 A1 | 6/2013 | Colon et al. |
| 2013/0166441 A1 | 6/2013 | Kobylkin et al. |
| 2013/0171929 A1 | 7/2013 | Adams et al. |
| 2013/0198066 A1 | 8/2013 | Wall et al. |
| 2013/0200146 A1 | 8/2013 | Moghadam |
| 2013/0217361 A1 | 8/2013 | Mohammed et al. |
| 2013/0226791 A1 | 8/2013 | Springer et al. |
| 2013/0238455 A1 | 9/2013 | Laracey |
| 2013/0246203 A1 | 9/2013 | Laracey |
| 2013/0262302 A1 | 10/2013 | Lettow et al. |
| 2013/0262317 A1 | 10/2013 | Collinge et al. |
| 2013/0317928 A1 | 11/2013 | Laracey |
| 2013/0318575 A1 | 11/2013 | Hart et al. |
| 2014/0001253 A1 | 1/2014 | Smith |
| 2014/0019352 A1 | 1/2014 | Shrivastava |
| 2014/0052637 A1 | 2/2014 | Jooste et al. |
| 2014/0061299 A1 | 3/2014 | Scipioni |
| 2014/0074581 A1 | 3/2014 | Johnson et al. |
| 2014/0074637 A1 | 3/2014 | Hammad |
| 2014/0074655 A1* | 3/2014 | Lim .................. G06Q 20/3265 |
| | | 705/26.1 |
| 2014/0096202 A1 | 4/2014 | Matsuda |
| 2014/0101734 A1 | 4/2014 | Ronda et al. |
| 2014/0108260 A1 | 4/2014 | Poole et al. |
| 2014/0108263 A1 | 4/2014 | Ortiz et al. |
| 2014/0110477 A1 | 4/2014 | Hammad |
| 2014/0114780 A1 | 4/2014 | Menefee et al. |
| 2014/0122331 A1 | 5/2014 | Vaish et al. |
| 2014/0129435 A1 | 5/2014 | Pardo et al. |
| 2014/0161258 A1 | 6/2014 | Yang et al. |
| 2014/0172577 A1 | 6/2014 | Rephlo |
| 2014/0181520 A1* | 6/2014 | Wendling ............ H04L 63/0869 |
| | | 713/169 |
| 2014/0207680 A1 | 7/2014 | Rephlo |
| 2014/0207682 A1 | 7/2014 | Wolfond et al. |
| 2014/0229377 A1 | 8/2014 | Vakklaganti |
| 2014/0263625 A1 | 9/2014 | Smets et al. |
| 2014/0279522 A1 | 9/2014 | Musser et al. |
| 2014/0324698 A1 | 10/2014 | Dolcino et al. |
| 2014/0337089 A1 | 11/2014 | Tavares |
| 2014/0337236 A1* | 11/2014 | Wong ................. G06Q 20/3829 |
| | | 705/41 |
| 2014/0339315 A1 | 11/2014 | Ko |
| 2014/0344153 A1 | 11/2014 | Raj et al. |
| 2014/0370851 A1 | 12/2014 | Wang et al. |
| 2014/0372308 A1 | 12/2014 | Sheets |
| 2015/0004934 A1 | 1/2015 | Qian et al. |
| 2015/0032569 A1 | 1/2015 | Stromberg |
| 2015/0032625 A1 | 1/2015 | Dill et al. |
| 2015/0032627 A1* | 1/2015 | Dill ...................... G06Q 20/385 |
| | | 705/44 |
| 2015/0046276 A1 | 2/2015 | Artman et al. |
| 2015/0046338 A1 | 2/2015 | Laxminarayanan et al. |
| 2015/0046339 A1 | 2/2015 | Wong et al. |
| 2015/0046340 A1 | 2/2015 | Dimmick |
| 2015/0073995 A1* | 3/2015 | Hayhow ............. G06Q 20/3823 |
| | | 705/71 |
| 2015/0081461 A1* | 3/2015 | Adrangi ................ G07G 1/009 |
| | | 705/17 |
| 2015/0081538 A1 | 3/2015 | Renard et al. |
| 2015/0098463 A1 | 4/2015 | Davis et al. |
| 2015/0149336 A1 | 5/2015 | Haggerty et al. |
| 2015/0156601 A1 | 6/2015 | Donnellan et al. |
| 2015/0161591 A1 | 6/2015 | Yang |
| 2015/0170137 A1 | 6/2015 | Balbus |
| 2015/0186871 A1 | 7/2015 | Laracey |
| 2015/0195133 A1 | 7/2015 | Sheets et al. |
| 2015/0248664 A1 | 9/2015 | Makhdumi et al. |
| 2015/0269565 A1 | 9/2015 | Inotay et al. |
| 2015/0356560 A1 | 12/2015 | Shastry et al. |
| 2015/0371234 A1 | 12/2015 | Huang et al. |
| 2016/0026697 A1 | 1/2016 | Rinearson et al. |
| 2016/0036790 A1* | 2/2016 | Shastry .............. G06Q 20/3821 |
| | | 713/168 |
| 2016/0078434 A1 | 3/2016 | Huxham et al. |
| 2016/0086166 A1 | 3/2016 | Pomeroy et al. |
| 2016/0086184 A1* | 3/2016 | Carpenter ............ G06Q 20/322 |
| | | 705/44 |
| 2016/0125396 A1* | 5/2016 | Brickell ............... G06Q 20/382 |
| | | 705/67 |
| 2016/0142174 A1 | 5/2016 | Fine et al. |
| 2016/0147526 A1 | 5/2016 | Camp et al. |
| 2016/0155111 A1 | 6/2016 | Arnald et al. |
| 2016/0162883 A1 | 6/2016 | Liscia et al. |
| 2016/0173483 A1 | 6/2016 | Wong et al. |
| 2016/0180330 A1 | 6/2016 | Feldman |
| 2016/0232524 A1 | 8/2016 | Barrale et al. |
| 2016/0241402 A1 | 8/2016 | Gordon et al. |
| 2016/0247233 A1 | 8/2016 | Page |
| 2016/0253651 A1 | 9/2016 | Park et al. |
| 2016/0275492 A1 | 9/2016 | Brickell et al. |
| 2016/0292673 A1 | 10/2016 | Chandrasekaran |
| 2016/0294550 A1 | 10/2016 | French et al. |
| 2016/0307184 A1 | 10/2016 | Peyton et al. |
| 2016/0307186 A1 | 10/2016 | Noe et al. |
| 2016/0364938 A1 | 12/2016 | Miranda et al. |
| 2017/0004506 A1 | 1/2017 | Steinman et al. |
| 2017/0039557 A1 | 2/2017 | Murphy |
| 2017/0046679 A1 | 2/2017 | Gotlieb et al. |
| 2017/0063827 A1 | 3/2017 | Ricardo |
| 2017/0109745 A1 | 4/2017 | Al-Bedaiwi et al. |
| 2017/0116615 A1 | 4/2017 | Burgess et al. |
| 2017/0249132 A1 | 8/2017 | Andrews et al. |
| 2017/0262819 A1 | 9/2017 | Malhotra et al. |
| 2017/0302637 A1 | 10/2017 | Baba |
| 2017/0316493 A1 | 11/2017 | Numata |
| 2018/0012226 A1 | 1/2018 | Phillips et al. |
| 2018/0018661 A1 | 1/2018 | Murphy |

(56) References Cited

U.S. PATENT DOCUMENTS

| | | |
|---|---|---|
| 2018/0025349 A1 | 1/2018 | Marsh |
| 2018/0047022 A1 | 2/2018 | Schipperheijn |
| 2018/0053157 A1 | 2/2018 | Roffey |
| 2018/0089677 A1 | 3/2018 | Ali et al. |
| 2018/0101672 A1 | 4/2018 | George |
| 2018/0160255 A1 | 6/2018 | Park |
| 2018/0181978 A1 | 6/2018 | Weinberger et al. |
| 2018/0197171 A1 | 7/2018 | Steinman et al. |
| 2018/0204195 A1 | 7/2018 | Kang |
| 2018/0211248 A1 | 7/2018 | Sims et al. |
| 2018/0233001 A1 | 8/2018 | Priebatsch |
| 2018/0255460 A1 | 9/2018 | Hammad et al. |
| 2018/0270066 A1 | 9/2018 | Doyon et al. |
| 2018/0285868 A1 | 10/2018 | O'Hara et al. |
| 2018/0330375 A1 | 11/2018 | Sharma |
| 2018/0336562 A1 | 11/2018 | Umanski et al. |
| 2019/0001732 A1 | 1/2019 | Ongsitco |
| 2019/0005494 A1 | 1/2019 | Hammad et al. |
| 2019/0066113 A1 | 2/2019 | Gupta et al. |
| 2019/0087813 A1 | 3/2019 | Wilson |
| 2019/0087817 A1 | 3/2019 | Adari |
| 2019/0087823 A1 | 3/2019 | Patel et al. |
| 2019/0089705 A1 | 3/2019 | Chud et al. |
| 2019/0109842 A1 | 4/2019 | Kumar et al. |
| 2019/0122222 A1 | 4/2019 | Uechi |
| 2019/0190717 A1 | 6/2019 | Beric et al. |
| 2019/0197553 A1 | 6/2019 | Conway |
| 2019/0238504 A1 | 8/2019 | Gupta et al. |
| 2019/0303917 A1 | 10/2019 | Locke et al. |
| 2019/0332912 A1 | 10/2019 | Walker |
| 2020/0007536 A1 | 1/2020 | Piel |
| 2020/0019725 A1 | 1/2020 | Rule et al. |
| 2020/0034870 A1 | 1/2020 | Dao et al. |
| 2020/0042975 A1 | 2/2020 | Gueorguiev et al. |
| 2020/0082384 A1 * | 3/2020 | Guise .................. G06Q 20/356 |
| 2020/0104474 A1 | 4/2020 | Duane et al. |
| 2020/0104833 A1 | 4/2020 | Rule et al. |
| 2020/0106614 A1 | 4/2020 | Rule et al. |
| 2020/0106615 A1 | 4/2020 | Rule et al. |
| 2020/0106619 A1 | 4/2020 | Osborn et al. |
| 2020/0154278 A1 | 5/2020 | Douglas et al. |
| 2020/0184462 A1 | 6/2020 | Rule et al. |
| 2020/0202322 A1 | 6/2020 | Tanner et al. |
| 2020/0238952 A1 | 7/2020 | Lindsay et al. |
| 2020/0242588 A1 | 7/2020 | Rule et al. |
| 2020/0242616 A1 | 7/2020 | Waughtal |
| 2020/0302436 A1 | 9/2020 | Ilincic et al. |
| 2020/0304311 A1 | 9/2020 | Rule et al. |
| 2020/0314644 A1 | 10/2020 | Dean et al. |
| 2020/0380483 A1 | 12/2020 | Kang |
| 2020/0380495 A1 | 12/2020 | Kang |
| 2021/0004786 A1 | 1/2021 | Mossler et al. |
| 2021/0067316 A1 | 3/2021 | Bellenger et al. |
| 2021/0158333 A1 | 5/2021 | Cohen et al. |
| 2021/0272097 A1 | 9/2021 | Wen et al. |
| 2021/0279793 A1 | 9/2021 | Leise et al. |
| 2021/0319427 A1 | 10/2021 | Rule et al. |
| 2021/0342809 A1 | 11/2021 | Rule et al. |
| 2021/0342816 A1 | 11/2021 | Benkreira et al. |
| 2021/0383381 A1 | 12/2021 | Aabye et al. |
| 2022/0036340 A1 | 2/2022 | Hollander et al. |
| 2022/0092589 A1 | 3/2022 | Osborn et al. |
| 2022/0198448 A1 | 6/2022 | Ilincic et al. |
| 2022/0300981 A1 | 9/2022 | Sharma et al. |
| 2022/0335432 A1 | 10/2022 | Rule et al. |
| 2022/0405741 A1 | 12/2022 | Rule et al. |
| 2022/0407724 A1 | 12/2022 | Osborn et al. |
| 2023/0020843 A1 | 1/2023 | Bowers et al. |
| 2023/0021963 A1 | 1/2023 | Singhal et al. |
| 2023/0050991 A1 | 2/2023 | Rule et al. |
| 2023/0052901 A1 | 2/2023 | Boryk et al. |
| 2023/0059546 A1 | 2/2023 | Huang et al. |
| 2023/0169503 A1 | 6/2023 | Rule et al. |
| 2023/0237466 A1 | 7/2023 | Rule et al. |
| 2023/0281594 A1 | 9/2023 | Mchugh et al. |
| 2023/0343165 A1 | 10/2023 | Rule et al. |
| 2023/0410087 A1 | 12/2023 | Hollander et al. |
| 2023/0418923 A1 | 12/2023 | Ogbennah et al. |
| 2024/0046266 A1 | 2/2024 | Rule et al. |
| 2024/0046272 A1 | 2/2024 | Benkreira et al. |
| 2024/0054498 A1 | 2/2024 | Sinha et al. |
| 2024/0062206 A1 | 2/2024 | Osborn et al. |

FOREIGN PATENT DOCUMENTS

| | | | |
|---|---|---|---|
| CN | 108075888 A | 5/2018 | |
| EP | 1773018 A1 * | 4/2007 | ........... G06F 21/305 |
| EP | 2 889 823 A1 | 7/2015 | |
| EP | 3 531 358 A1 | 8/2019 | |
| EP | 3 079 326 B1 | 10/2020 | |
| EP | 3 761 248 | 6/2021 | |
| GB | 2 476 989 A | 7/2011 | |
| KR | 20160064061 A | 6/2016 | |
| KR | 2018015920 A | 2/2018 | |
| KR | 20180015920 A | 2/2018 | |
| KR | 2020020442 A | 2/2020 | |
| KR | 20200020442 A | 2/2020 | |
| OA | 17553 A | 2/2017 | |
| WO | WO-0146775 A2 * | 6/2001 | ........... H04M 1/675 |
| WO | WO-2005/098737 A2 | 10/2005 | |
| WO | WO-2005/119607 A2 | 12/2005 | |
| WO | WO-2005/119608 A1 | 12/2005 | |
| WO | WO-2006/023839 A2 | 3/2006 | |
| WO | WO-2007/038896 A2 | 4/2007 | |
| WO | WO-2007/076476 A2 | 7/2007 | |
| WO | WO-2010/033944 A2 | 3/2010 | |
| WO | WO-2010027331 A1 * | 3/2010 | ............. G06F 21/35 |
| WO | WO-2010/127244 A2 | 11/2010 | |
| WO | WO-2010/127244 A3 | 11/2010 | |
| WO | WO-2012/042262 A1 | 4/2012 | |
| WO | WO-2012/154915 A1 | 11/2012 | |
| WO | WO-2013/010096 A1 | 1/2013 | |
| WO | WO-2013028910 A2 * | 2/2013 | ............. G06Q 20/10 |
| WO | WO-2014/170668 A1 | 10/2014 | |
| WO | WO-2015/101439 A1 | 7/2015 | |
| WO | WO-2015/104387 A1 | 7/2015 | |
| WO | WO-2015/117451 A1 | 8/2015 | |
| WO | WO-2015114460 A2 * | 8/2015 | ........... G06Q 20/322 |
| WO | WO-2015/167425 A1 | 11/2015 | |
| WO | WO-2016/001867 A2 | 1/2016 | |
| WO | WO-2016/028779 A1 | 2/2016 | |
| WO | WO-2016/049745 A1 | 4/2016 | |
| WO | WO-2016/122457 A1 | 8/2016 | |
| WO | WO-2017/096399 A1 | 6/2017 | |
| WO | WO-2017/174200 A3 | 10/2017 | |
| WO | WO-2018/217106 A1 | 11/2018 | |
| WO | WO-2019/238688 A1 | 12/2019 | |
| WO | WO-2020/122898 A1 | 6/2020 | |
| WO | WO-2020/222143 A1 | 11/2020 | |

OTHER PUBLICATIONS

Borchert, B.; Gunther, M.;Indirect NFC-Login on a Non-NFC Device using an NFC-Smartphone; international Journal of Intelligent Computing Research; vol. 4, Iss. 4, Dec. 2013; 7 Pages.

FIDO Alliance. Open Authentication Standards More Secure than Passwords. fidoalliance.org. Accessed Jul. 23, 2019.

Kadambi et al., "Near-Field Communication-Based Secure Mobile Payment Service", Proceedings of the 11th International Conference on Electronic Commerce, ACM, 2009.

Liao, Shannon. "Google will not let you use your Android phone as a physical security key." www.theverge.com/2019/4/10/18295348/google-android-phone-fido-webauthn-phishing-two-factor-authentication. Apr. 10, 2019. Accessed Jul. 23, 2019.

Liao, Shannon. "Google will now let you use your Android phone as a physical security key." www.theverge.com/2019/4/10/18295348/google-android-phone-fido-webauthn-phishing-two-factor-authentication., Apr. 10, 2019. Accessed Jul. 23, 2019.

(56) References Cited

OTHER PUBLICATIONS

Poroye, Adeola Oluwaseyi. "Secure contactless mobile financial services with Near Field Communication", Diss. University of the Western Cape, 2011. Located via Google Scholar, http://etd.uwc.ac.za/bitstream/handle/11394/1752/Poroye_MSC_2011.pdf?sequence=1.

Robert Triggs ("All you need to know about NFC Tags", Android Authority, Aug. 29, 2018) (Year: 2018).

Robert Triggs, "All you need to know about NFC Tags", Android Authority, Aug. 29, 2018, p. 2 (Year: 2018).

Russell, "3 Reasons Why Tap and Pay (NFC) is Awesome", Jun. 9, 2018, Helcim Articles (Year: 2018).

Triggs, R., "All You Need to Know About NFC Tags," Android Authority, Aug. 29, 2018, 6 pages.

Wong, Wen Teng. "Security of NFC payment on mobile payment application", Diss. UTAR, 2018. Located via Google Scholar, http://eprints.utar.edu.my/3050/1/fyp_CS_2018_WWT_-_1403709.pdf.

Yang, "Security Enhanced EMV-Based Mobile Payment Protocol", Hindawi Publishing Corporation, The Scientific World Journal, vol. 214, Article ID 864571, 2014, 19 pages.

Poroye, Adeola Oluwaseyi. "Secure contactless mobile financial services with Near Field Communication", Diss. University of the Western Cape, 2011. Located via Google Scholar, http:l/etd.uwc.ac.za/bitstream/handle/11394/1752/Poroye MSC 2011.pdf?sequence=1.

EMV, "Integrated Circuit Card Specifications for Payment Systems,"—v. 4.3, Book 3, 2011. (Year: 2011).

P. Urien, "EMV-TLS, a secure payment protocol for NFC enabled mobiles," 2014 International Conference on Collaboration Technologies and Systems (CTS), Minneapolis, MN, USA, 2014, pp. 203-210, doi: 10.1109/CTS.2014.6867565. (Year: 2014).

R. Schamberger, G. Madlmayr and T. Grechenig, "Components for an interoperable NFC mobile payment ecosystem," 2013 5th International Workshop on Near Field Communication (NFC), Zurich, Switzerland, 2013, pp. 1-5, doi: 10.1109/NFC.2013.6482440. (Year: 2013).

Triggs, R., "All you need to know about NFC Tags", 2018, Android Authority (2 Pages).

* cited by examiner

SYSTEMS AND METHODS FOR CONTACTLESS SMART CARD AUTHENTICATION

CROSS-REFERENCE TO RELATED APPLICATIONS

This application is a continuation of U.S. patent application Ser. No. 16/291,917, entitled "Systems and Methods for Contactless Smart Card Authentication," filed on Mar. 4, 2019, which is a continuation of U.S. patent application Ser. No. 15/081,500, entitled "Systems and Methods for Contactless Smart Card Authentication," filed on Mar. 25, 2016, which claims priority to U.S. Provisional Patent App. No. 62/139,411, entitled "Systems and Methods for Contactless Smart Card Authentication," filed on Mar. 27, 2015, all of which are incorporated herein by reference in their entireties and for all purposes.

BACKGROUND

Financial institutions such as banks typically offer their customers a variety of payment alternatives to meet their needs. One such alternative is for the financial institution to offer the customer a payment card that provides the customer with quick and convenient access to a charge account from multiple locations where the card is accepted. Charge accounts can include, for example, lines of credit, checking accounts, temporary prepaid accounts, and so on. The card issuer typically provides the customer with a plastic card or other device having an account number associated therewith, and establishes a corresponding charge account for the customer. The card or other device may be used by the customer to purchase goods and services by charging the charge account. The card issuer authorizes payment for the goods or services and then enters a debit to the charge account. As a security measure, new payment cards are typically issued to customers in an inactivated state. Customers may then verify their identities and thereby activate their respective payment cards.

Many mobile computing devices such as tablets and smartphones include software applications and hardware sufficient to provide a mobile pay function. Mobile pay functions allow customers to purchase goods and services from vendors with their mobile devices, using funds from their charge accounts in the absence of a physical payment card. A given customer can authorize the use of a payment card in their mobile device, which may then be used to facilitate a purchase transaction without having to provide the physical payment card to a vendor.

Payment card information sufficient to enable the mobile pay service can often be found on the face of the payment card itself. As such, an unauthorized user with visual or temporary access to a payment card may be able to activate a mobile pay service associated with that payment card on their own mobile device (e.g., by taking a digital image of the payment card or writing down the payment card information, and activating mobile pay later on) and proceed with unauthorized purchases.

SUMMARY

One example embodiment includes a method of authenticating a smart card using a mobile device. The method includes receiving, by a payment card processing logic, a new payment card application. The method further includes underwriting, by the payment card processing logic, the new payment card application to approve or deny the new payment card application. The method includes provisioning, by a token provisioning logic, an enabling token to the mobile device wherein the mobile device is associated with an approved new payment card applicant.

Another example embodiment relates to a card issuer computing system. The system includes a customer database storing account information for a plurality of customer accounts and a network interface structured to send and receive data over a network. The system further includes a processing circuit comprising memory and a processor. The processing circuit is structured to receive a new payment card application from a payment card applicant, to underwrite the new payment card application to approve or deny the new payment card application, and to provision an enabling token to the mobile device, wherein the mobile device is associated with an the approved new payment card applicant.

These and other features, together with the organization and manner of operation thereof, will become apparent from the following detailed description when taken in conjunction with the accompanying drawings, wherein like elements have like numerals throughout the several drawings described below.

DETAILED DESCRIPTION

According to various embodiments, systems and methods for authenticating a smart card and a corresponding mobile pay function with a mobile device is provided. At a high level, a smart card is a physical card (e.g., formed with plastic, metal, etc.) containing information relating to a corresponding charge account or payment account that can be wirelessly exchanged. For example, the smart card may be a credit card, a debit card, or the like associated with an account of the user. In turn, the mobile pay function associates a customer's personal information and payment information (e.g., account number or token thereof, expiration date, cryptogram, etc.) associated with at least one smart card to the customer's mobile device, thereby allowing the mobile device to subsequently facilitate a purchase of goods or services in the absence of the physical smart card (e.g., by providing the payment information to a merchant point of sale). In some arrangements, payment information associated with a payment account of the user can be transmitted directly to the mobile pay function without issuance of a physical smart card (e.g., during a credit application process) such that the user can use the mobile pay function without ever receiving a physical card.

Figure 1:
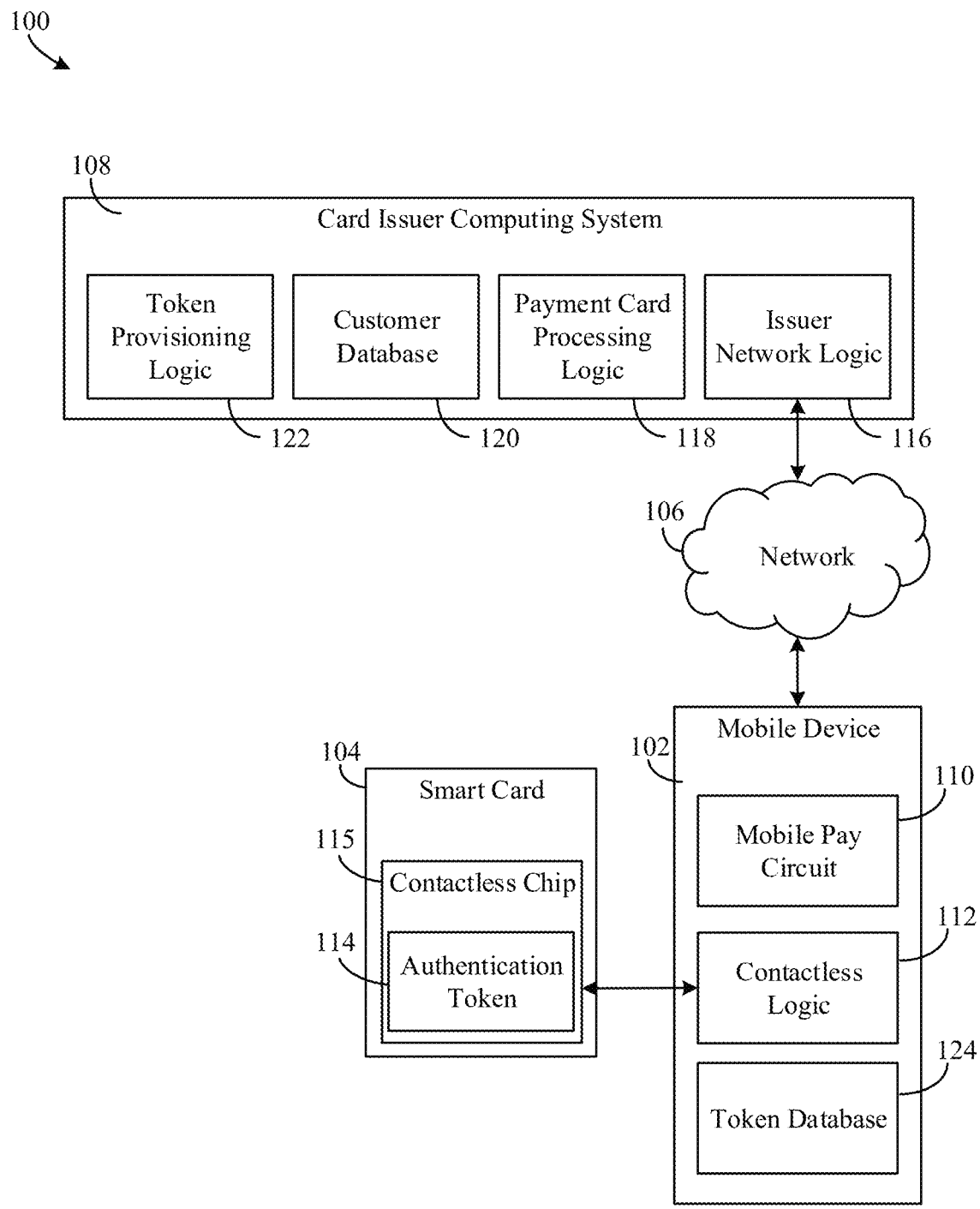
FIG. 1 is a block diagram illustrating a smart card authentication and transaction system, according to an example embodiment.

Referring now to FIG. 1, an authentication and transaction system 100 includes a mobile device 102, a smart card 104, a network 106, and a card issuer computing system 108. Examples of a mobile device 102 may include, for example, mobile phones, smartphones, tablets, wearable computing devices (e.g., eyewear), laptop computers, and so on. A common feature of the mobile device 102 is the ability to access a network 106 in order to send and receive data to and from the card issuer computing system 108, including authentication requests. The network 106 may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 106 includes the internet.

The mobile device 102 includes a mobile pay circuit 110. The mobile pay circuit 110 may include program logic executable by the mobile device 102 to implement at least some of the functions described herein. In order to make the mobile pay circuit 110, a third party provider (e.g., a software developer or publisher) can make a software application available to be placed on the mobile device 102. For example, a software developer may make the software application available to be downloaded (e.g., via the developer's website, via an app store, or in another manner). Responsive to a customer selection of an appropriate link, the software application can be transmitted to the mobile device 102 and cause itself to be installed on the mobile device 102. Installation of the software application creates the mobile pay circuit 110 on the mobile device. Specifically, after installation, the thus-modified mobile device 102 includes the mobile pay circuit 110 (embodied as a processor and instructions stored in non-transitory memory that are executed by the processor), which is configured to process and exchange information among the various components of the mobile device 102 and the card issuer computing system 108.

The mobile device 102 further includes contactless logic 112. The contactless logic 112 includes hardware and associated software sufficient to enable the mobile device 102 to wirelessly and securely exchange data over short distances (e.g., within a range of a few inches or less). In some arrangements, the contactless logic 112 is configured to use radio frequency identification (RFID) to exchange digital information. In some such arrangements, the contactless logic 112 enables the mobile device 102 to exchange data over a radio frequency range required for near field communication (NFC). In some arrangements, the mobile pay circuit 110 includes instructions to selectively employ the contactless logic 112 to send or receive information.

The mobile device 102 also includes a token database 124. A token is a discrete, coded and/or encrypted segment of data that can be transmitted across the network 106 and stored in various digital storage media, including local storage devices in the mobile device 102. A given token can be associated with any of a variety of types data, including personal information, account information, authorizations and permissions, and so on. As such, the token may be a proxy for the given type of data. The token database 124 includes at least one token provisioned by a token provisioning logic 122 in the manner discussed in more detail below. In an alternative arrangement, the token database 124 is stored remotely and accessed when a token is needed. In such arrangement, the token database 124 may be stored at the card issuer computing system 108, and, when a token is needed (e.g., a payment token during a transaction with a merchant), the token can be retrieved from the card issuer computing system 108 by the mobile device 102.

The smart card 104 is a payment card associated with a charge account (e.g., a line of credit, a checking account, a prepaid account, and the like) for a given customer, and is capable of wirelessly exchanging information. In some arrangements, the smart card 104 is a credit card or a debit card. The smart card 104 can include visible information on the face of the card and digital information stored within various structures in the smart card 104 itself. For example, the smart card 104 can include a customer's name and a payment card account number, an expiration date, and the like, which can be printed or embossed on the physical card. Further, the smart card 104 can include more detailed identifying customer information (e.g., name, address, phone number, and so on) and account information (e.g., account numbers, information as to the card issuer, expiration date, CVV, and so on) in a magstrip, or an onboard contactless chip 115.

The contactless chip 115 is a defining feature of the "smart" aspect of the smart card 104. The contactless chip 115 is a small circuitry system configured to wirelessly exchange data. In some arrangements, the contactless chip 115 can exchange data via RFID or NFC communication. The contactless chip 115 can be configured to be able to selectively transmit various types of information, including payment card information (e.g., account numbers, issuing entities, and so on), identifying customer information (e.g., customer name, billing address, phone number, and so on). Such arrangements can be found in existing smart card functions provided by, for example, Visa payWave™, Mastercard PayPass™, and American Express ExpressPay™. In some arrangements, the payment card information may be transmitted as a token. The token can include a tokenized account number and additional payment information (e.g., expiration date, CVV, etc.). The token, when received by the card issuer computing system 108 via the payment network (e.g., via the network 106), can be cross referenced against a token vault to identify the actual payment information (e.g., the actual account number associated with the customer).

The contactless chip 115 can also be configured to transmit an authentication token 114. In some arrangements, the authentication token 114 is a cryptogram. In some arrangements, the cryptogram is a sequence of characters that have been encoded through one or more algorithms to conceal data from unauthorized parties. In other arrangements, the cryptogram is a string of encrypted characters generated by the contactless chip 114 with an encryption key stored on the contactless chip 115. In some such arrangements, the cryptogram does not include any payment card information or identifying customer information, but may be decrypted to verify that the cryptogram was generated by the smart card 104 as associated with payment card and/or identifying customer information at a card issuer computing system 108 in the manner discussed below.

The card issuer computing system 108 is a computing system at a financial entity that issued the smart card 104 to a customer. In the context of the present disclosure, the financial entity can include financial institutions such as commercial or private banks, credit unions, investment brokerages, and so on, but can also include any commercial entity capable of maintaining charge accounts, including retailers, vendors, service providers, and the like. The card issuer computing system 108 is configured to manage charge accounts and authenticate transactions involving debits from charge accounts associated with existing customers.

The card issuer computing system 108 includes an issuer network logic 116, a payment card processing logic 118, a customer database 120, and a token provisioning logic 122. The issuer network logic 116 is configured to enable the card issuer computing system 108 to exchange information over the network 106. The issuer network logic 116, for example, may include a network interface structured to send and receive data over the network 106. The customer database 120 can be configured to contain information for a plurality of customers with issued smart cards, including for example, personal customer information (e.g., names, addresses, phone numbers, and so on) and customers' financial information (e.g., associated financial institutions, account numbers, available credit, credit history, and so on). The information contained in the customer database 120 is sufficient for the card issuer computing system 108 to perform a variety of checks surrounding a given smart card, including for example, confirming identifying customer information, determining a customer's transaction history, determining a customer's available credit, and so on.

The payment card processing logic 118 is configured to perform operations relating to the smart card 104. In one aspect, the payment card processing logic 118 can be configured to receive and underwrite new payment card applications (e.g., as received over the network 106 via the issuer network logic 116), and ultimately issue or deny new payment cards to customers. In one such arrangement, the payment card processing logic 118 can access and use information stored in the customer database 120 (e.g., account balances, payment histories, and so on) to underwrite a payment card application. The payment card processing logic 118 can also be configured to use information received from third parties over the network 106 (e.g., credit reporting agencies, sources of public records such as default judgments, and so on) for the underwriting process. Further, in some arrangements, the payment card processing logic 118 can be configured to identify individuals with sufficient creditworthiness to be pre-approved for a new payment card. In some arrangements, the payment card processing logic 118 is further configured to notify the token provisioning logic 122 of an approved new payment card application.

In another aspect, the payment card processing logic 118 can be configured to receive a payment card authentication request from the mobile pay circuit 110 over the network 106 via the issuer network logic 116. In some such arrangements, the authentication request includes the authentication token 114, which in turn may include at least one cryptogram. The payment card processing logic 118 may then forward the at least one cryptogram to the token provisioning logic 122 to decrypt the cryptogram, verify or interpret the resulting data and any additional information in the authentication token 114 using information in the customer database 120, and return the results to the payment card processing logic 118. The payment card processing logic 118 may then approve or deny the authentication request, and push the approval or denial back to the mobile pay circuit 110.

The token provisioning logic 122 may be used to facilitate various services associated with tokens, including provisioning (e.g., generating) new tokens, authorizing a token for use in a financial transaction, storing payment card tokens (e.g., in the customer database 120), and managing the life cycles of the payment card tokens. The token provisioning logic 122 is configured to exchange information with the customer database 120, the payment card processing logic 118, and with remote systems over the network 106 via the issuer network logic 116. As discussed above, the token provisioning logic 122 is also structured to decrypt received cryptograms to verify that the cryptograms were generated by authorized devices and correspond to active payment accounts.

The token provisioning logic 122 may be executed to provision a payment card token, which may include generating the payment card token itself and linking the payment card token to the payment card. The payment card token is intended to replace sensitive information related to the payment card, such as a charge account number or other original account information. Once generated, a given payment card token may be used to execute a transaction rather than exchanging the sensitive account information. For instance, a customer may request the provisioning of a payment card token from the token provisioning logic 122 over the network 106 through the mobile device 102 in order to conduct an electronic transaction using a charge account associated with a corresponding payment card.

The payment card token generated by the token provisioning logic 122 may be any type of digital token or code suitable for use as a payment credential, such as a numerical code, an alphanumerical code, a collection of abstract characters, and so on. In some arrangements, the token is an encrypted copy of sensitive information itself (e.g., an encrypted charge account number). In other arrangements, the token is a unique digital tag associated with sensitive information that can be interpreted by an authorized computing system (e.g., the token provisioning logic 122 can identify a given token, and retrieve the token's corresponding information from the customer database 120). In an example embodiment, the payment card token is a tokenized sixteen digit number. For instance, where the charge account underlying the payment card is a credit or debit card account, the tokenized sixteen digit number may be used as a payment credential in place of the original sixteen digit number of the credit or debit card. In this embodiment, the payment card token may have a unique BIN (e.g., the first four digits of the original card number), but retains the same last four digits as the original card number in order to accurately match the payment card token to the account holder (i.e., the payment card owner). The remaining numbers may be generated by the token provisioning logic 122 using various tokenization or encryption algorithms.

The token provisioning logic 122 may also be configured to link (i.e., assign) the payment card token to the associated payment card. For instance, the payment card token may be persistently linked to a corresponding payment card such that the payment card token may be re-used in a future transaction to make a payment using the same payment card. The payment card token may also be linked to the payment card such that the payment card and/or the account holder must be periodically re-authenticated in order to use the payment card token in subsequent transactions. The payment card token may also be linked to any of an account holder, a mobile device, or a financial institution. The associations with the payment card token may be stored in a token vault.

In some arrangements, the payment card processing logic 118 and the token provisioning logic 122 may be embodied as a processing circuit. The processing circuit includes hardware (e.g., a processor and memory) and software structured to execute the functions of the payment card processing logic 118 and the token provisioning logic 122 as described herein. In further arrangements, each of the payment card processing logic 118 and the token provisioning logic 122 are embodied as separate processing circuits.

In operation, a customer can create a new payment card application at any of a number of brick and mortar locations or networked customer interfaces (e.g., a website displayed on the mobile device 102) associated with a card issuing entity (e.g., a bank, a credit union, a retailer, or the like). The new payment card application can be received by the payment card processing logic 118 from the network 106 via the issuer network logic 116. The payment card processing logic 118 may then begin underwriting the new payment card application (i.e., in an arrangement where the underlying customer is not pre-approved).

At any time before, after, or during the underwriting process, the customer associated with the new payment card application can install a mobile pay application on the mobile device 102 giving rise to the mobile pay circuit 110. The mobile pay circuit 110 may be configured to cause the mobile device 102 to present a graphical customer interface on an associated display, prompting the customer to set up a mobile pay account. As part of the setup process, in some arrangements, the graphical customer interface can prompt the customer to enter identifying information (e.g., name, address, phone number, etc.), which may be accomplished through an input device associated with the mobile device 102 (e.g., a touchscreen, a physical keyboard, voice recognition, or the like). In some arrangements, the mobile pay circuit 110 is configured to send a notification that the customer has set up a mobile pay function on the mobile device 102 to the card issuer computing system 108.

In some arrangements, after the customer completes a new payment card application, the token provisioning logic 122 can be configured to send a preliminary payment card token to the mobile pay circuit 110 over the network 106 via the issuer network logic 116. The preliminary payment card token is a code containing characters sufficient for the mobile pay circuit 110 to, for example, identify the card issuer associated with the card issuer computing system and the type of payment card (e.g., a credit card, a debit card, a prepaid card, or the like). In some arrangements, the preliminary payment card token does not include information sufficient to complete a transaction entailing a debit against the new corresponding charge account (e.g., payment card account numbers are missing, or a security code is missing, or the like). In some arrangements, the preliminary payment card token includes a notification to the mobile pay circuit 110 to disallow any transactions entailing a debit against the new charge account. In either type of arrangement, the preliminary payment card token does not enable the mobile pay circuit 110 to complete a transaction with a new payment card corresponding to the new payment card application, but may allow the mobile pay circuit 110 to inform the corresponding customer that the new payment card application is being processed (e.g., a notice on a graphical customer interface that the new payment card application is pending). Accordingly, the preliminary payment card token serves as a placeholder in the mobile pay circuit 110 while the customer's credit application is being processed.

Upon completing the underwriting process and approving the new payment card application, the payment card processing logic 118 can cause the physical smart card 104 corresponding to the new payment card application to be issued to the customer (e.g., sending the smart card 104 to the customer by mail). In one arrangement, the payment card processing logic 118 can be configured to notify the token provisioning logic 122 that the new payment card application has been approved. In one such arrangement, the token provisioning logic 122 can be configured to send an enabling payment card token to the mobile pay circuit 110, sufficient to allow the mobile pay circuit 110 to allow transactions involving debits against a new charge account associated with the approved new payment card application, which can be stored in the token database 124. The enabling payment card token replaces the preliminary payment card token.

For example, the enabling payment card token can include payment card account information sufficient to cause a purchase transaction to occur (e.g., where the token includes a charge account number). As another example, the enabling payment card token can cause the mobile pay circuit 110 to allow transactions on the mobile device 102 involving the new payment card to occur. As yet another example, the mobile pay circuit 110 can be configured to send the enabling payment card token back to the card issuer computing system 108 each time the customer wishes to complete a purchase (i.e., providing a signal to the card issuer computing signal to complete a transaction against the corresponding payment card). The token provisioning logic 122 can send the enabling payment card token as soon as the new payment card application has been approved, and as such, transactions against the new charge account can be made through the mobile device 102 before the customer actually receives the smart card 104.

In arrangements where the smart card 104 is issued in an inactivated state (i.e., where transactions using the physical smart card 104 cannot occur, whether with the smart card 104 itself at a physical point of sale, over the mobile device 102, or otherwise), the customer will need to activate the smart card 104 before any transactions can be made with it. Further, in arrangements where the token provisioning logic 122 is not configured to provide the mobile pay circuit 110 with an enabling payment card token as soon as the payment card processing logic 118 approves the new payment card application, the customer may have to activate the use of the smart card 104 in the mobile device 102 as well.

As part of the activation process, the mobile pay circuit 110 communicates with the contactless chip 115 on the smart card 104 to receive the authentication token 114 via the contactless logic 112. As discussed above, the authentication token 114 can include a cryptogram. The authentication token 114 can also include identifying customer information (e.g., name, billing address, phone number, and so on) and payment card information (e.g., charge account number, issuing entity, and so on) to provide sufficient information for the mobile pay function on the mobile device 102 to operate, and for the payment card processing logic 118 to identify and confirm the identity of the customer. The contactless chip 115 transmits the authentication token 114 to the mobile pay circuit 110 by, for example, being brought within a threshold proximity sufficient to allow a wireless data exchange between the contactless logic 112 of the mobile device 102 and the contactless chip 114 on the smart card 104 (e.g., via RFID, NFC, or the like). Upon receiving a wireless signal transmission from the contactless chip 115, the contactless logic 112 can route the authentication token 114 to the mobile pay circuit 110.

In one arrangement, the mobile pay circuit 110 receives an authentication token 114 that includes a cryptogram intended to be used for authenticating the smart card 104 and/or the mobile device 102. In one arrangement, the mobile pay circuit 110 transmits the authentication token 114 to the card issuer computing system 108 in an authentication request over the network 106. In some such arrangements, the authentication request is a transaction authorization request entailing a charge of little to no funds (e.g., a transaction of $0.01, or $0.00). In those arrangements, the payment card processing logic 118 at the card issuer computing system 108 can receive what appears to be a normal transaction authorization request (i.e., not meaningfully distinguishable from an actual purchase transaction at a point of sale) and proceed to process the authentication request as a transaction authorization request. As such, the payment card processing logic 118 may not have to be altered or tailored to address authentication request from a mobile device 102, but can simply apply existing transaction authorization procedures instead. The payment card processing logic 118 can proceed to use the token provisioning logic 122 to decrypt the cryptogram from the authentication token 114, and confirm that the resulting data corresponds to the smart card 104 and the customer (i.e., the customer attempting to enable a mobile pay function on the mobile device 102) by, for example, retrieving data from the customer database 120. In some such arrangements, the payment card processing logic 118 can recognize that a requested transaction of $0.00 indicates an attempt to authenticate a mobile device or a new payment card and apply a specific set of authentication rules.

Further, in some arrangements, the mobile pay circuit 110 can be configured to take additional authentication steps at the mobile device 102 to supplement the authentication process occurring at the card issuer computing system 108. For example, the mobile pay circuit 110 can, for example, require the customer to enter a PIN number, biometric data, or answers to identification questions into a graphical customer interface in the mobile device 102. In addition, the mobile pay circuit 110 can compare identifying customer information contained in the authentication token 114 received from the contactless chip 115 to identifying customer information stored in the mobile device 102 (e.g., where the mobile device is registered under a given individual, accounts configured in various mobile applications in the mobile device 102, and the like).

If the authentication request passes all of the authentication rules at the card issuer computing system 108, the payment card processing logic 118 can approve the authentication request. In some arrangements, after approving the authentication request, the payment card processing logic 118 causes the token provisioning logic 122 to send an enabling payment card token to the mobile pay circuit 110 over the network 106 via the issuer network logic 116, in the manner described above. Further, in some arrangements, approving the authentication request includes enabling subsequent transactions using the physical smart card 104 itself (e.g., in a brick and mortar store). In some such arrangements, the payment card processing logic 118 can update information in the customer database 120 to show an authentication of the physical smart card 104, and that transactions based on the physical smart card 104 should be allowed.

Upon receiving an authentication approval and an enabling payment card token from the card issuer computing system 108, the mobile pay circuit 110 can confirm that the customer and the mobile device 102 is authorized to access and use the charge account(s) associated with the smart card 104. In which case, the mobile pay circuit 110 can subsequently use the smart card 104 to complete purchase transactions.

Figure 2:
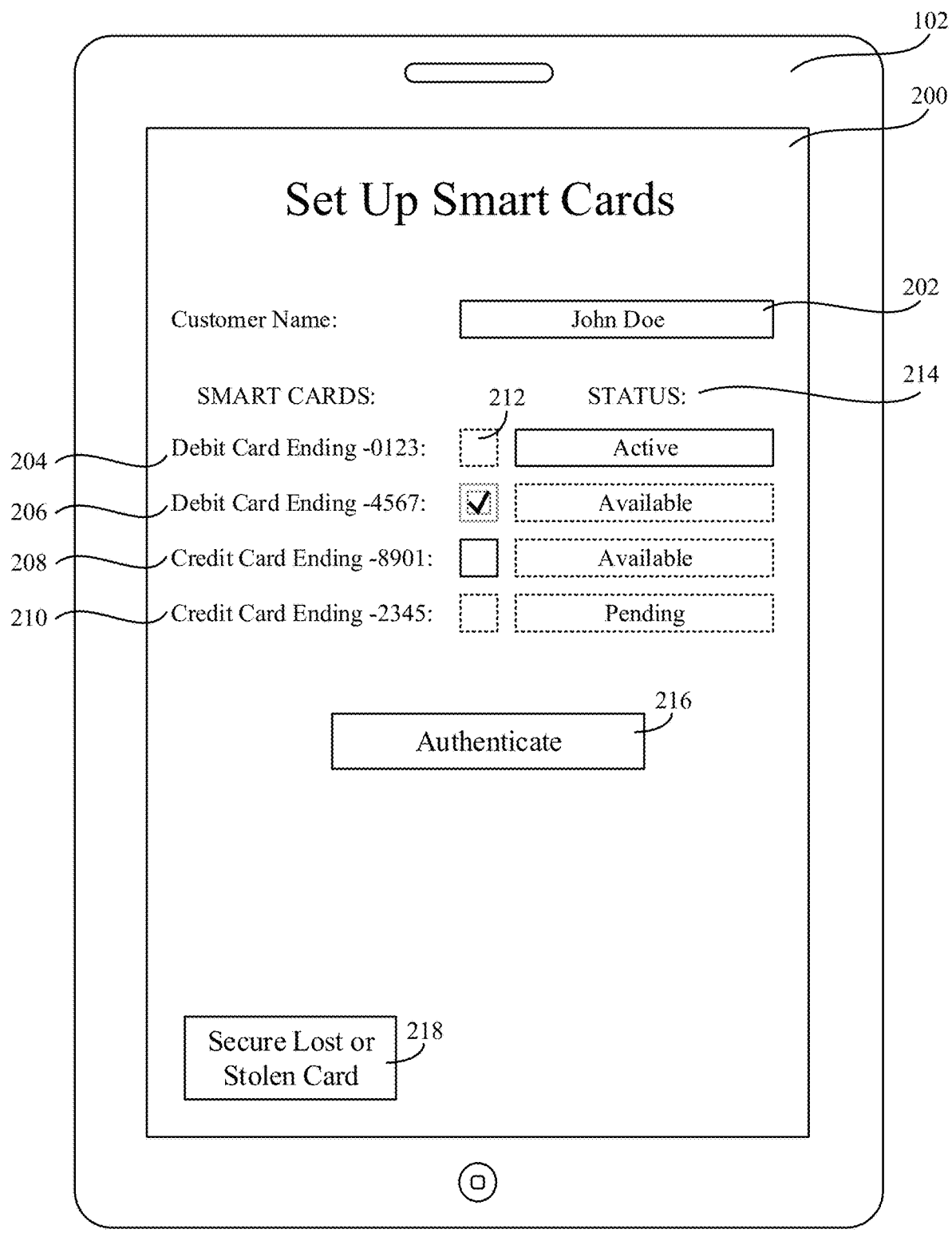
FIG. 2 is a depiction of a customer interface that may be used to facilitate receiving and sending authentication and payment data, according to an example embodiment.

Referring now to FIG. 2, an example graphical customer interface 200 generated by a mobile pay circuit (e.g., mobile pay circuit 110) on a mobile device 102 is shown according to one example embodiment. The graphical customer interface 200 shown includes a plurality of notices and fields directed to allow a customer to authenticate and enable the use of smart cards (e.g., smart card 104) on the mobile device 102. The graphical customer interface 200 includes a customer name identifier 202, a listing of smart cards (i.e., 204, 206, 208, 210), a selection toggle 212 corresponding to each of the smart cards, a status notice 214 corresponding to each of the smart cards, an authentication trigger 216, and a replacement trigger 218.

The customer name identifier 202 indicates the identity of the customer whose associated smart cards are included in the graphical customer interface 200. The listing of smart cards includes information sufficient to identify each respective smart card 204, 206, 208, 210 (e.g., here, a payment card type and the last four account numbers for each card). In some arrangements, the listing of smart cards only includes smart cards from one particular card issuing entity (e.g., the graphical customer interface 200 is associated with only a financial institution, such as a bank). In other arrangements, the listing includes smart cards associated with a given customer that are issued from a plurality of issuers (e.g., a mobile pay circuit providing a mobile wallet feature, where payment cards from multiple issuers can be collected, organized, and used). A customer can use the selection toggles 212 to pick smart cards upon which to perform functions, such as authenticating or securing them in the manner discussed below.

The status notices 214 are associated with actions that may be taken for a given smart card. For example, the "Active" status 214 for the -0123 debit card 204 can indicate that the card has been approved by its respective issuer, and authenticated for use on the mobile device 102. In other words, transactions can be completed by the -0123 debit card 204 on the mobile device 102 or with the corresponding physical smart card. In some arrangements, the "Active" status results from the customer applying for the -0123 debit card 204, being approved for the card, receiving the physical card, and authenticating the physical card via a contactless logic (e.g., contactless logic 112) on the mobile device 102. In other arrangements, the "Active" status resulted from an enabling payment card token being provided to the mobile device 102 as soon as the card issuer approved the payment card application (i.e., in advance to the customer receiving the physical payment card). As such, the -0123 debit card 204 does not need to be further authenticated, and the respective selection toggle 212 is dashed out, indicating that it cannot be used.

As to the -4567 debit card 206 and the -8901 credit card 208, these cards show an "Available" status. In this particular arrangement, the "Available" status 214 indicates that the customer has been approved for a given smart card, but that smart card has not yet been authenticated (i.e., the physical card itself and/or for use on the mobile device 102). For example, in one arrangement, after a card issuer corresponding to the -4567 debit card 206 approves the customer's payment card application, the mobile device 102 can receive a notice to that effect and update the graphical customer interface 200 to show an "Available" status for the -4567 debit card. In such an arrangement, the customer can activate the -4567 debit card 206 after receiving the physical -4567 debit card 206 by authenticating the card via, for example, a contactless logic on the mobile device 102.

In one arrangement, the listing of smart cards can include all or several of the smart cards associated with the individual shown in the customer name identifier 202. For example, the -8901 credit card 208 can be a preexisting, previously authenticated smart card associated issued to John Doe. Upon creating a mobile pay circuit (e.g., mobile pay circuit 110) in the mobile device 102 giving rise to the graphical customer interface 200, the mobile circuit can identify John Doe and list all payment accounts associated with him (e.g., payment accounts associated with issued smart cards). The -8901 credit card 208 can be a physical smart card that John Doe has owned and used for years, but not yet on the mobile device 102. As such, if John Doe wishes to use the -8901 credit card 208 on the mobile device 102, he can select the selection toggle 212 corresponding to the -8901 credit card 208, and authenticate the associated payment account for use on the mobile device 102 (e.g., via an associated contactless logic).

The -2345 credit card 210 has a "Pending" status 214. In some arrangements, the "Pending" status indicates that a new payment card application has been received at a corresponding card issuer, and is currently being underwritten. In some such arrangements, the "Pending" status is generated as a result of the mobile device 102 receiving a preliminary payment card token from the card issuer. The "Pending" status 214 indicates that the -2345 credit card 210 has not yet been approved and therefore cannot be authenticated or used, and as such, the selection toggle 212 corresponding to the -2345 credit card is dashed out and cannot be selected.

The authentication trigger 216 is a customer-selectable link that can cause a mobile circuit (e.g., mobile circuit 110) underlying the graphical customer interface 200 to authenticate a smart card corresponding to a chosen selection toggle 212. Choosing a selection toggle 212 and then pressing the authentication trigger 216 can, for example, enable an associated contactless logic (e.g., contactless logic 112) to detect a contactless chip (e.g., contactless chip 115) to authenticate the chosen smart card. In an alternative arrangement, pressing the authentication trigger 216 can cause the mobile pay circuit 110 to send an authentication request to the card issuer computing system in the absence of a physical smart card 104 (e.g., such that the mobile pay circuit 110 can be enabled for the card prior to receiving the physical smart card 104 in the mail and after being approved for a line of credit).

In the event a smart card or another mobile device with authenticated payment card information is lost or stolen, a customer can press the replacement trigger 218 on the mobile device 102 to secure corresponding charge accounts. For example, in one arrangement, a customer can select the replacement trigger 218, and identify the smart card that was lost or stolen. In turn, a corresponding card issuer computing system (e.g., card issuer computing system 108) can update a customer database (e.g., customer database 120) to disallow any subsequent transactions based on the lost physical smart card. In another example, the customer can identify the lost or stolen mobile device, in which case the card issuer computing system can update the customer database to prevent any subsequent transactions from the lost mobile device. Further, the token provisioning logic 122 can be configured to provision new enabling payment card tokens corresponding to the lost smart card or the authenticated payment cards in the lost mobile device to the mobile device 102.

Figure 3:
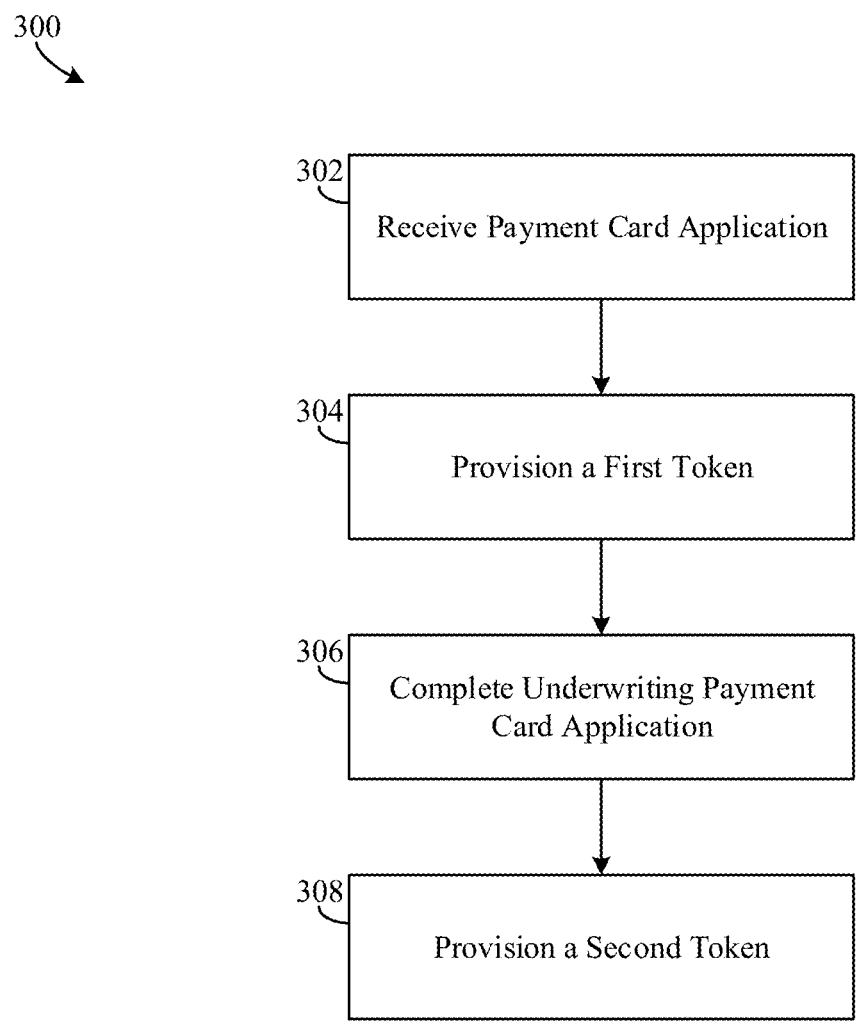
FIG. 3 is a flowchart of a method of authenticating a smart card according to an example embodiment.

Referring now to FIG. 3, a method 300 of authenticating smart card for transactions through a mobile device is shown. The method 300 is performed by processing and storage hardware on a card issuer computing system (e.g., card issuer computing system 108), as executed by one or more logics comprising one or more software applications configured to perform the functions described below.

At 302, a payment card application is received. The payment card application can be received by a payment card processing logic (e.g., payment card processing logic 118) at the card issuer computing system. In some arrangements, the payment card application is received over a network (e.g., network 106). The payment card application includes information sufficient for the payment card processing logic to underwrite the underlying applicant to determine whether the application should be approved (e.g., name, address, social security number, and so on), and a request for an identified payment card (e.g., a credit card, a debit card, or the like).

At 304, a first token is provisioned. The first token is provisioned by a token provisioning logic (e.g., token provisioning logic 122) at the card issuer computing system. The first token can be, for example, a preliminary payment card token (i.e., as discussed with respect to FIG. 1, above). The token provisioning logic can provision the first token by generating a code that can be interpreted and applied by a mobile pay circuit (e.g., mobile pay circuit 110 disposed in the applicant's mobile device 102). The first token can indicate to the mobile pay circuit that the new payment card application is pending. In some arrangements, the first token does not allow the mobile pay circuit to cause any transactions associated with the new payment card application to occur. The token provisioning logic can transmit the first token to the mobile pay circuit over a network via an issuer network logic (e.g., issuer network logic 116). When the first token is received by the mobile pay circuit of the mobile device, the first token causes a mobile pay application on the mobile device to add the pending payment card such that the applicant can view the status of the application (e.g., as described with respect to FIG. 2).

At 306, underwriting the payment card application is completed. The payment card processing logic at the card issuer computing system performs the underwriting process to determine whether a new payment card application should be approved. In one such arrangement, the payment card processing logic accesses information stored in a customer database (e.g., customer database 120) containing, for example, customer account balances, payment histories, and so on. The payment card processing logic can also underwrite a given new payment card application using information received from third parties over the network (e.g., credit reporting agencies, sources of public records such as default judgments, and so on). Further, in some arrangements, the payment card processing logic can be configured to identify individuals with sufficient creditworthiness to be pre-approved for a new payment card, and as such, can complete an underwriting process for those individuals in very little time.

At 308, a second token is provisioned. The second token is provisioned by the token provisioning logic at the card issuer computing system, and allows transactions based on a new payment card corresponding to an approved new payment card application to occur. The token provisioning logic can send the second token to the mobile pay circuit over a network, which can store the second token in a token database (e.g., token database 124). In various arrangements, the mobile pay circuit can transmit and exchange the second token across data networks to complete transactions, or use information from the second token itself to complete transactions. Along with the second token, the token provisioning logic can transmit the necessary algorithms or encryption keys to the mobile pay circuit to allow the mobile pay circuit to generate an authentication token (e.g., authentication token 114), such as a cryptogram that is used to authenticate the second token during a payment transaction. The second token may be provisioned prior to providing the customer a physical smart card or in the absence of a physical smart card entirely. Accordingly, in some arrangements, the customer can provide payment through the newly opened account via the mobile device without ever receiving a physical payment card (e.g., smart card 104).

In some arrangements, the second token is provisioned after the underwriting process is complete at 306. In other arrangements, the second token is provisioned after the underwriting process is complete at 306 and the payment card processing logic receives an authentication token corresponding to the new payment card, as sent by the mobile pay circuit over a network.

The above-described systems and methods provide for improved identity authentication systems that allow entities (e.g., people) to authenticate themselves on an attribute-by-attribute basis instead of providing too much sensitive information. For example, if a person is attempting to authenticate themselves for a purchase of alcohol (requiring that the person is at least 21 years of age), the person can just provide the alcohol seller (e.g., store, bar, restaurant, etc.) with just their age, thereby avoiding the provision of unnecessary information (e.g., address, height, weight, driver's license number, etc.).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of activating a card having a contactless chip, the method comprising:
    providing the card in a non-activated state;
    activating the card prior to an initial card transaction, wherein activating the card comprises:
        receiving, from a mobile device via a wireless transmission from the card having the contactless chip to the mobile device, an authentication request including a cryptogram and a transaction charge amount of $0.00 or $0.01;
        processing, based on the transaction charge amount, the authentication request as a transaction request to reveal the cryptogram;
        decrypting the cryptogram to reveal information regarding at least one of the card or a user;
        comparing the revealed information regarding the at least one of the card or the user to information in a customer database, and verifying the cryptogram generated by the card corresponds to an active payment account;
        updating the customer database to indicate that the revealed information regarding the at least one of the card or the user is confirmed and verified; and
        activating, in response to a successful user authentication at the mobile device, the card for the initial card transaction based on updating the customer database and the successful user authentication; and
    providing, to the mobile device, a payment card token associated with the card as part of a mobile wallet transaction using the mobile device involving the card.

2. The method of claim 1, wherein the payment card token causes a payment application on the mobile device to add the card and present a status of the card.

3. The method of claim 2, further comprising:
    receiving, via the payment application of the mobile device, a selection of a selectable element on a graphical user interface indicating the card is lost or stolen.

4. The method of claim 3, further comprising:
    updating the customer database to disallow subsequent transactions associated with the payment card token based on the indication that the card is lost or stolen; and
    providing, to a replacement mobile device, a replacement payment card token.

5. The method of claim 1, wherein the wireless transmission is a near-field communication (NFC) tap with the mobile device.

6. The method of claim 1, wherein the successful user authentication includes information associated with at least one of a PIN, biometric data, or an answer to an identification question prior to activating the card.

7. The method of claim 1, further comprising:
    generating an encryption key for the card; and
    providing, to the mobile device, the encryption key for generating the cryptogram.

8. The method of claim 7, wherein the cryptogram is encrypted using the encryption key, and wherein confirming that the revealed information regarding the at least one of the card or the user corresponds to the information in the customer database further comprises verifying the cryptogram was generated by the card.

* * * * *